United States Patent [19]

McGauley

[11] 4,008,169
[45] Feb. 15, 1977

[54] PREPARATION OF IRON OXIDE SORBENT FOR SULFUR OXIDES

[76] Inventor: Patrick John McGauley, 7 Plymouth Road, Port Washington, N.Y. 11050

[22] Filed: Mar. 7, 1975

[21] Appl. No.: 556,347

Related U.S. Application Data

[62] Division of Ser. No. 403,953, Oct. 5, 1973, abandoned.

[52] U.S. Cl. .............................. 252/191; 423/244; 423/541 R
[51] Int. Cl.$^2$ ..................... C01B 17/00; C09K 3/00
[58] Field of Search ................... 423/242–244, 423/541; 252/190, 191

[56] References Cited

UNITED STATES PATENTS

| | | | |
|---|---|---|---|
| 1,412,452 | 4/1922 | Coolbaugh | 423/244 |
| 1,789,507 | 1/1931 | Aarts | 252/190 |
| 2,202,414 | 5/1940 | Barnes et al. | 423/153 |

FOREIGN PATENTS OR APPLICATIONS

| | | | |
|---|---|---|---|
| 3,178 | 1857 | United Kingdom | 423/242 |
| 2,987 | 1858 | United Kingdom | 423/242 |
| 4,199 | 1818 | United Kingdom | 423/242 |
| 183 | 1873 | United Kingdom | 423/242 |

Primary Examiner—Oscar R. Vertiz
Assistant Examiner—Gregory A. Heller
Attorney, Agent, or Firm—Donnelly, Maky, Renner & Otto

[57] ABSTRACT

A highly sorbent iron oxide for use in the purification of dilute sulfur and oxygen-bearing gases is prepared by a two step process which involves a low temperature decomposition of iron sulfate and a low temperature oxidation of the intermediate product.

5 Claims, 2 Drawing Figures

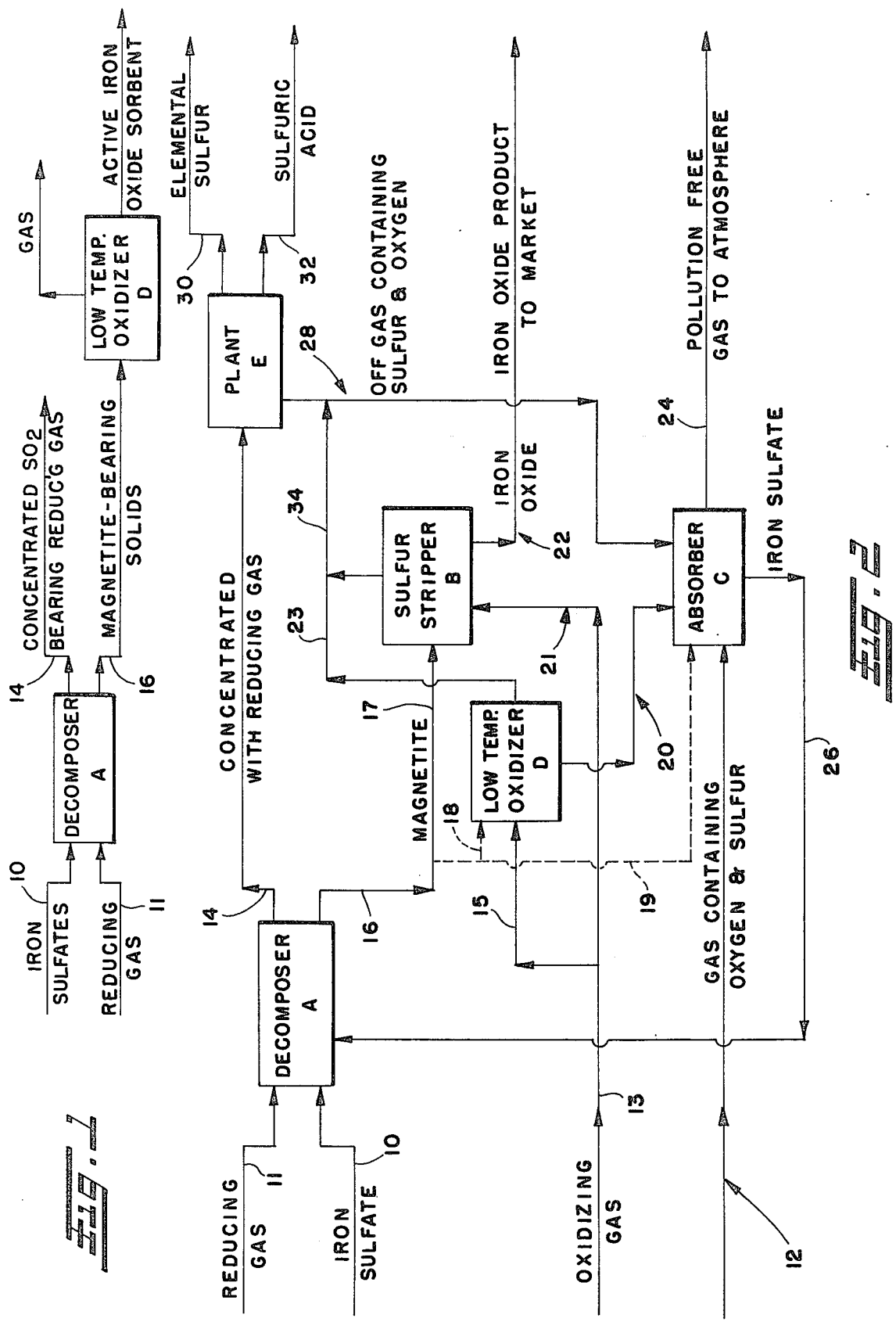

PREPARATION OF IRON OXIDE SORBENT FOR SULFUR OXIDES

This is a division of application Ser. No. 403,953, filed Oct. 5, 1973, now abandoned.

BACKGROUND OF THE INVENTION

This invention relates generally to a highly active iron oxide dry sorbent for the oxides of sulfur contained in gases, and more particularly, to a procedure for preparing such active sorbent. The invention also relates to the use of such oxides as sorbents.

Many industrial operations produce iron sulfate, sulfur-bearing gases, or combinations of both as waste materials. Such waste materials are commonly produced from mining and industrial operations involving the production of non-ferrous metals, coal, steel, titanium pigments, sulfuric acid, elemental sulfur, electric power, and similar products. Discharge of these waste materials results in undesirable pollution of air and water.

Iron sulfate has been used, for example, in the treatment of sewage and the making of iron oxide pigments, but the production of this by-product has been greater than its consumption in such processes. Therefore, where iron sulfate is produced in significant quantities, it has been necessary to dispose of the material as a waste material such as by dumping on land or in water.

A number of attempts have been made to convert the sulfate to some more useable form of iron-bearing material such as iron oxide. For example, U.S. Pat. No. 3,195,981 describes the decomposition of iron sulfate at temperatures between 700° and 1100° C. Decomposition at the lower temperature is satisfactory so long as the oxygen content in the gases leaving the bed is 3% or less, otherwise $SO_3$ is formed. The decomposition of metal sulfates, particularly mixtures of metal sulfates also is described in U.S. Pat. No. 3,630,943. Regeneration of manganous oxide from a manganese sulfate spent sorbent in the presence of reducing agents is described in U.S. Pat. No. 3,723,598. Manganous oxide is preferred over manganese dioxide as an absorbent.

Air pollution with sulfur dioxide is a major problem in the United States today. Sulfur dioxide is objectionable principally because above relatively low concentrations it is toxic to human beings and animals and is destructive to vegetation. Sulfur dioxide and its oxidation products, sulfur trioxide and sulfuric acid, are a major source of acidity in rain and fog which in turn can be very corrosive.

At the present time, the largest amount of industrial sulfur oxide emissions results from the combustion of certain types of coal and oil which contain appreciable amounts of sulfur. Waste gas streams containing sulfur dioxide similarly are produced by other industrial processes such as in the smelting of sulfur-bearing ores, the refining of sulfur-containing crude oils, the synthesis of sulfuric acid, the sulfonation of hydrocarbons, the production of coke, the production of sulfur in a Claus process, the production of paper by way of wood-pulping process, and similar industrial processes.

Furthermore, the discharge of these gas streams containing sulfur dioxide into the atmosphere constitutes a waste of a valuable material because the sulfur contained therein is an industrial commodity. Currently, tens of millions of tons of sulfur oxides are released into the atmosphere over populated regions of the United States each year. Thus, the recovery of some of this sulfur dioxide either as such or in another form could result in the accumulation of a supply of useful chemicals of definite value.

Many processes have been proposed for removal of sulfur dioxide from these gas streams. Most of the proposed removal procedures which have been suggested utilize liquid sorption in which the sulfur dioxide containing gases are intimately contacted with an aqueous sorbent which typically contains chemicals in solution or in slurry which will react with the sulfur dioxide and absorb the same into the liquid solution. Examples of such sorbents include the oxides, hydroxides and carbonates of ammonia, the alkali metals, and the alkaline earth metals.

One disadvantage of the wet sorption process is that the sorption of the sulfur dioxide must occur at a rather low temperature. This results in cooling of the gases which are ultimately discharged to the atmosphere. Such cool gases will remain near ground level thus causing pollution of the ambient air at ground level which may be as serious as that presented by the untreated flue gas.

Other methods have been suggested for removing sulfur oxides from flue gases. Attempts to desulfurize fuels prior to combustion have been costly and not always effective. For some fuels, such as coal, many processes investigated to date do not economically desulfurize fuel.

Additive processes have been suggested wherein materials having the ability to combine with sulfur oxides are added either to the fuel or to the combustion gases. Additives which have been employed include soda, limestone, magnesia and magnesite, but such additives generally are costly.

Dry adsorption also has been suggested. Sulfur dioxide can be adsorbed at low temperatures by materials such as aluminum oxide, activated carbon, and silica gel. A disadvantage of such adsorption processes is that they also require relatively low temperatures and have similar drawbacks to those of the wet absorption process described above.

Solid acceptors which absorb sulfur oxides also have been reported. Examples of such acceptors include alkalized alumina which is converted to aluminum sulfate and mixtures of alkali metal oxides and iron oxide which are also converted to the corresponding sulfates. One important advantage of these solid absorption processes is that they can be operated at elevated temperatures, and the gas which ultimately is discharged to the atmosphere is at an elevated temperature and is readily dissipated in the atmosphere. There continues to be a need, however, for solid acceptors which are regenerative and economically acceptable in commercial scale absorption processes.

SUMMARY OF THE DISCLOSURE

It has been found that the sulfur and oxygen absorbing properties of iron oxides are significantly improved when the iron oxide is prepared by the low temperature process of this invention which comprises decomposing an iron sulfate in a reducing atmosphere at a temperature of from about 300° to about 700° C. The temperature and reducing agent concentration are controlled to convert the iron sulfate to magnetite. Well-known reducing agents such as gaseous mixtures of hydrogen and carbon monoxide may be utilized in the invention. A particularly effective sorbent for the oxides of sulfur is obtained if the iron oxide obtained by the low temperature decomposition of the sulfate is subjected to a low temperature oxidation treatment.

The iron oxide obtained in the above manner is useful in absorbing sulfur contained in emission gases from the combustion of certain types of coal and oil. The sorbent also is useful in extracting the sulfur oxides from waste gas streams containing the same produced by other industrial processes such as the smelting of sulfur-bearing minerals, the refining of sulfur-containing crude oils, the production of sulfur in a Claus process, etc.

BRIEF DESCRIPTION OF THE DRAWINGS

FIG. 1 is a flow diagram showing the operation of the process of this invention for producing the iron oxide-bearing sorbent of the invention; and FIG. 2 is a flow diagram showing one modification of the operation of the process of this invention for producing the iron oxide-bearing sorbent of the invention and its utility in purifying gases containing sulfur and oxygen.

DESCRIPTION OF THE PREFERRED EMBODIMENTS

The highly active iron oxide sorbent of this invention is obtained by the process of decomposing an iron sulfate in contact with a reducing gas whose composition is in equilibrium with magnetite at a temperature of from about 300° to about 700° C., and preferably between 400°–600° C.

The iron sulfate utilized in the preparation of the iron oxide sorbent of this invention may be ferrous sulfate, ferric sulfate, hydrated forms of the above two sulfates, or $Fe_2S_2O_9 \cdot xH_2O$ which often is found combined with the ferrous or ferric sulfate.

Iron sulfates such as those described above may be converted to magnetite by decomposing the sulfates, in an atmosphere of suitable composition and temperature. Because magnetite is the desired product, the temperature of the decomposition and the concentration of the reducing gas utilized are interrelated as will be described below. The temperature of the decomposition may vary from between about 300° C. to about 700° C. although temperatures from about 400° C. to about 600° C. are preferred. Any equipment in which contact can be effected between a gas and a solid may be used for the decomposition. For example, fixed bed, moving bed and fluid bed techniques may be utilized. It has been observed that decomposition accomplished at lower temperatures results in a more active magnetite product.

The hot reducing gases used in the decomposition process normally contain both CO and $H_2$ as essential components, and normally are generated by the partial combustion of commercial fuels with air, and/or with preheated air. These gases normally are generated at high temperatures, and are used in the decomposition process at much lower temperatures. They normally provide both heat and chemical reagents for use in the reactions of the decomposition process. Moreover, they normally are generated in separate equipment attached to the decomposition reactor, but when certain types of commercial fuel are available for use in the process, the gas generation may be accomplished in the decomposition reactor.

The hot reducing gases utilized in the process of the invention may be generated by partial combustion of commercial fuel with air in chemical reactions such as the following exothermic reactions:

1. $CH_4 + 2O_2 = CO_2 + 2H_2O$

2. $CH_4 + O_2 = CO + H_2O + H_2$

3. $2C + O_2 = 2CO$

4. $CO + H_2O = CO_2 + H_2$

In the low temperature decomposition process of this invention, the hot gas product from the above gasification reactions is processed in contact with iron sulfate-bearing solids in gas contacting equipment such as fixed bed, fluid bed, or transport reactors. The gas is utilized both as a source of reducing agent and a source of heat for the decomposition process. Moreover, the composition and temperature of the gas in the reaction zone of the process determines the composition and many of the properties of both the gas and solid products from the process. For example, the ability of the iron oxide obtained by the low temperature decomposition process of the invention to absorb the oxides of sulfur is improved.

When the product gases from the reaction zone of the decomposition process are held between limits of composition and temperature that generate magnetite as a major component of the iron-bearing product, the decomposition reactions can be carried out both at temperatures and with ratios of fuel and air that are unusually low. The use of low temperature decomposition results in the generation of a product gas which is more concentrated in sulfur dioxide.

The desired range of temperature is between 300 and 700° C., and preferably is between 400° and 600° C. The concentration of reducing agents in the feed gases utilized should be such that the product gas is in equilibrium composition with magnetite in the product at these temperatures.

The desired reactions of the decomposition process may be described by equations such as the following:

5. $3FeSO_4 + 2H_2 = Fe_3O_4 + 2H_2O + 3SO_2$

6. $3FeSO_4 + 2CO = Fe_3O_4 + 2CO_2 + 3SO_2$

7. $3Fe_2(SO_4)_3 + 10H_2 = 2Fe_3O_4 + 10H_2O + 9SO_2$

8. $3Fe_2(SO_4)_3 + 10 CO = 2Fe_3O_4 + 10 CO_2 + 9SO_2$

9. $3Fe_2O_3 + H_2 = 2Fe_3O_4 + H_2O$

10. $3Fe_2O_3 + CO = 2Fe_3O_4 + CO_2$

The iron oxide products from the decomposition process of this invention, when generated both at low temperature and high content of magnetite, are unusually reactive with oxides of sulfur from dilute sulfur and oxygen-bearing gases. These iron-bearing solids also are highly effective for use as sorbents in the purification of dilute sulfur and oxygen-bearing gases. Moreover, when used as sorbents in the purification of sulfur-bearing gases, the solid product from the absorption reaction contains iron sulfates and is suitable for recycle as feed to the low temperature decomposition step of this invention.

When the iron oxide-bearing product from this novel decomposition process is utilized in the purification of dilute sulfur and oxygen-bearing gases, the objectionable sulfur from these gases is finally recovered in the form of a concentrated sulfur-bearing product gas from the decomposition process of this invention. The concentrated sulfur-bearing product gas from the decomposition process of this invention is suitable for use as a feed material for the production of sulfuric acid or elemental sulfur.

The magnetite obtained by the low temperature decomposition of the sulfates described above is subjected to a low temperature oxidation. When the magnetite is oxidized at a temperature below about 450° C., it is converted to a product (principally hematite) which is highly reactive toward the absorption of the oxides of sulfur. At higher oxidation temperatures, the effectiveness of the product as a sorbent is minimized.

The oxidation of the magnetite-bearing solids prior to contact with the gas containing the oxides of sulfur may be accomplished by contacting the magnetite solids with an oxidizing agent such as air or oxygen while maintaining a low temperature.

The oxidation of the magnetite can also occur in the absorption zone by reacting with oxygen in the sulfur and oxygen-bearing gases. The magnetite-bearing solid obtained from the decomposition zone is advanced directly to the absorber where it is contacted with a gaseous mixture containing both oxygen and the oxides of sulfur.

The iron oxide product from the decomposition process of the invention also is suitable for conversion to an iron oxide product of commercial quality. When iron sulfate from waste material is the feed to the process, the process of the invention provides a method for converting the recovered iron oxide to a saleable product. Moreover, the process of this invention provides a procedure for removing the objectionable sulfur and improving the quality of the magnetite-bearing product from this process.

The purification procedures of this invention involve treatment of the hot magnetite-bearing product from the decomposition process in contact with air in fluid bed equipment. When oxygen from the air is used in reactions with the magnetite, sufficient heat is produced to remove any remaining objectionable sulfur from the iron oxides; by reactions such as the following:

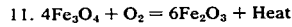
11. $4Fe_3O_4 + O_2 = 6Fe_2O_3 + Heat$

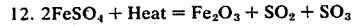
12. $2FeSO_4 + Heat = Fe_2O_3 + SO_2 + SO_3$

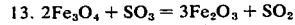
13. $2Fe_3O_4 + SO_3 = 3Fe_2O_3 + SO_2$

The removal of the objectionable sulfur generally does not require complete conversion of the magnetite to hematite, and the purified product from this novel process generally will contain both magnetite and hematite.

The iron oxides obtained by the low temperature decomposition and oxidation processes described above are particularly effective sorbents for sulfur oxides from gases containing the same, particularly dilute concentrations of sulfur oxides in gases. The iron oxide reacts with the oxides of sulfur to form iron sulfates, possibly in accordance with chemical reactions such as the following:

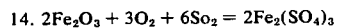
14. $2Fe_2O_3 + 3O_2 + 6So_2 = 2Fe_2(SO_4)_3$

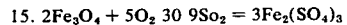
15. $2Fe_3O_4 + 5O_2\ 30\ 9So_2 = 3Fe_2(SO_4)_3$

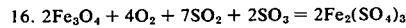
16. $2Fe_3O_4 + 4O_2 + 7SO_2 + 2SO_3 = 2Fe_2(SO_4)_3$

The absorption temperature range may be from about 250°–550° C., and preferably from about 325° C. to about 450° C. The iron oxide is placed in an absorbing unit containing one or more beds of the iron oxide. The beds may be of the fixed, moving or fluidized type. The sulfur and oxygen-bearing waste gases pass through these absorbing units and the oxides of sulfur are absorbed forming iron sulfates, particularly ferric sulfate.

The preferred embodiments of the invention are illustrated in FIGS. 1 and 2 and the specific examples given below. FIG. 1 shows one arrangement of the process of the present invention for producing an iron oxide-bearing solid sorbent from iron-bearing solids containing iron sulfates.

The solids containing the iron sulfate are advanced as indicated by arrow 10 to decomposer A which may be, for example, a fluid bed unit. Hot reducing gases are fed to the decomposer as indicated by arrow 11. The fluid bed is operated at a temperature between about 400° and 600° C. The concentration of reducing agents in the reducing gas is regulated to produce magnetite as the major solid component and a product gas that contains both sulfur dioxide at high concentration and reducing agents in low concentration. This sulfur dioxide-bearing product gas is discharged from decomposer A as indicated by arrow 14. This high temperature sulfur dioxide-bearing gas is a useful product which can be utilized in the preparation of elemental sulfur or sulfuric acid as desired, although this is not shown in FIG. 1. Magnetite-bearing solids are recovered from decomposer A and fed to low temperature oxidizer D as shown by arrow 16. In oxidizer D, the magnetite-bearing solids are contacted with a dilute oxidizing gas to provide a temperature below about 450° C. within oxidizer D. A highly active iron oxide sorbent is recovered from oxidizer D. A product gas containing sulfur exits from oxidizer D which may be treated as desired.

The arrangement in FIG. 2 illustrates the process of this invention wherein the iron oxide-bearing solid sorbent is utilized in the absorption of sulfur dioxide from gases that contain both sulfur and oxygen. The portions of FIG. 2 which are similar to those in FIG. 1 have been given like numerals and letters. In FIG. 2, the concentrated sulfur dioxide containing gas is recovered from the decomposer A as indicated by arrow 14 and is fed into plant E where the sulfur dioxide may be converted to elemental sulfur and withdrawn as indicated by arrow 30, or utilized in the production of sulfuric acid which is withdrawn as indicated by arrow 32.

The magnetite-bearing solid is removed from decomposer A as indicated by arrow 16. When it is desired to produce commercial quality iron oxide, the magnetite-bearing solid is fed to sulfur stripper B as indicated by arrow 17 where it is contacted with an oxidizing gas (e.g., air) at a temperature above about 750° C. and preferably between 750° and 850° C. in gas contacting equipment such as fluid bed reactors. The oxidizing gas is fed to sulfur stripper B as shown by arrows 13 and 21. The sulfur which is recovered from the magnetite-bearing solids in sulfur stripper B is removed in the off gas indicated as line 34 and may be fed to absorber C as shown by arrow 28 for removal of the remaining objectionable sulfur. Purified iron oxide is withdrawn from the sulfur stripper as shown by arrow 22.

Alternatively, where it is desired to utilize the magnetite-bearing solid as a sorbent for sulfur, the solid is fed either directly to absorber C as shown by arrow 19 or to low temperature oxidizer D as shown by arrow 18. Oxidizing gas (dilute) is fed to oxidizer D as shown by arrows 13 and 15 to provide an oxidizing temperature of less than 450° C. and preferably between about 350°–450° C. A hot product gas exits from oxidizer D and is fed to absorber C as shown by arrows 23 and 34. A highly active iron oxide sorbent is withdrawn from oxidizer D and fed to absorber C as shown by line 20.

In absorber C, the sorbent is contacted with gases containing dilute concentrations of oxides of sulfur and oxygen. This sulfur and oxygen containing gas may be derived from waste gases as indicated by arrow 12 and may be obtained as the off gas from plant E as indicated by arrow 28 or the off gas from oxidizer D indicated as arrows 23 and 34 which feed into arrow 28. The waste gas should be at a temperature such that the gas within the absorber zone is between about 250° and 650° C. If necessary, the gases fed into absorber C may be preheated (not shown). The sulfur and oxygen-bearing gases pass through absorber C and the sulfur and oxygen reacts with the iron oxide to form iron sulfates. The product gas from the absorber is essentially free of sulfur and is suitable for discharge to the atmosphere as a pollution free effluent, as indicated by arrow 24. The solid spent sorbent which generally is high in content of iron sulfate is removed from absorber C and may be recycled to decomposer A, as indicated by arrow 26.

The following examples also illustrate the process of the invention for preparing active iron oxide sorbents. Unless otherwise indicated, all percentages given below are percent by volume.

EXAMPLE 1

Three gram moles of ferrous sulfate monohydrate (510 gms.) are decomposed in a kiln with a reducing sweep gas composed of 47% nitrogen, 40% $CO_2$ and 13% CO at a temperature of 500° C. The gas flow is maintained at a rate of 1400 cc/min. for about 7 hours. The decomposition product which weighs 227 grams is identified by X-ray diffraction and optical examination to be predominantly magnetite with minor amounts of impurities. This decomposition product is an effective sorbent for sulfur dioxide from a gas containing sulfur and oxygen at a gas temperature of about 400° C.

EXAMPLE 2

Into a four inch reactor is placed 2,000 grams of −10 +48 mesh ferrous sulfate. The temperature is maintained at 500° C., and a reducing gas is passed through the reactor at a rate of 1.1 cfm. The reducing gas comprises 6% CO, 24% $CO_2$ and 70% $N_2$. The decomposition is essentially complete after 3 hours but is carried on for 5 hours. The magnetite-bearing product obtained in this manner is a sorbent for sulfur from gases containing dilute concentrations of sulfur and oxygen.

EXAMPLE 3

The procedure of Example 2 is repeated except that the temperature of decomposition is 550° C. A sorbent magnetite-bearing solid is obtained.

EXAMPLE 4

The procedure of Example 2 is repeated except that the temperature of decomposition is 600° C. A sorbent magnetite-bearing solid is obtained.

EXAMPLE 5

The procedure of Example 2 is repeated except that the reducing gas comprises a mixture of about 9% CO, 21% $CO_2$ and 70% $N_2$. A sorbent magnetite-bearing solid is obtained.

EXAMPLE 6

The procedure of Example 3 is repeated except that the reducing gas comprises a mixture of about 9% CO, 21% $CO_2$ and 70% $N_2$. A sorbent magnetite-bearing solid is obtained.

EXAMPLE 7

The procedure of Example 4 is repeated except that the reducing gas comprises a mixture of about 9% CO, 21% $CO_2$ and 70% $N_2$. A sorbent magnetite-bearing solid is obtained.

EXAMPLE 8

The procedure of Example 2 is repeated except that the reducing gas comprises a mixture of about 12% CO, 18% $CO_2$ and 70% $N_2$. A sorbent magnetite-bearing product is obtained.

EXAMPLE 9

The procedure of Example 3 is repeated except that the reducing gas comprises a mixture of about 12% CO, 18% $CO_2$ and 70% $N_2$. A sorbent magnetite-bearing product is obtained.

EXAMPLE 10

The procedure of Example 4 is repeated except that the reducing gas comprises a mixture of about 12% CO, 18% $CO_2$ and 70% $N_2$. A sorbent magnetite-bearing product is obtained.

The examples illustrated above and in FIGS. 1 and 2 demonstrate the utility of the invention in preparing an active iron oxide sorbent for oxides of sulfur, and the use of such iron oxides for extraction of sulfur from sulfur and oxygen-bearing gases. The procedure also is utilized for removing sulfur from waste gas streams of various industrial processes, such as the smelting of sulfur-bearing minerals, the refining of sulfur-containing crude oils, and from stack gases of industrial plants, such as power generating stations. In those instances where the waste gases contain a solid waste material such as fly ash, the gas may be subjected to a preliminary treatment to remove such solid materials.

The embodiments of the invention in which an exclusive property or privilege is claimed are defined as follows:

1. A process for the preparation of an improved iron oxide sorbent active for use in the purification of sulfur and oxygen-containing gases comprising:
   a. providing a quantity of iron sulfate-bearing solids,
   b. advancing said solids to a decomposition zone,
   c. contacting the solids with hot reducing gas at a temperature of from about 300° to about 700° C. under conditions to produce both a solid that contains magnetite and a product gas that contains both sulfur dioxide and reducing agents,
   d. separating the above magnetite-bearing solids from the gas, and
   e. oxidizing said magnetite-bearing solids at a temperature below about 450° C. to form an iron oxide-bearing solid sorbent.

2. The process of claim 1 wherein the magnetite-bearing solids are oxidized by contacting with a sulfur and oxygen-bearing gas in an absorption zone.

3. The process of claim 1 wherein the concentration of reducing agent in the hot reducing gas in the reaction zone is in equilibrium composition with magnetite in the decomposition product.

4. The process of claim 1 wherein the iron sulfate-bearing solid is principally iron sulfate.

5. A process for preparing iron oxide-bearing sorbent that are active for use in the purification of sulfur and oxygen-bearing gases comprising:
   a. providing a quantity of prepared iron oxide-bearing solids that contain iron sulfates and are suitable in particle size and mechanical properties for contacting with gases,
   b. advancing said solids to a decomposition zone,
   c. contacting the above solids in the decomposition zone with hot reducing gases to produce a solid that contains magnetite and a product gas that contains both sulfur dioxide and reducing agents, the temperature in the decomposition zone being between about 300° and 700° C.
   d. separating the magnetite containing solids from the product gas,
   e. recovering the product gas containing sulfur dioxide and reducing agents, and
   f. oxidizing the magnetite-bearing solids at a temperature below about 450° C. to form a highly active iron oxide-bearing sorbent for sulfur from sulfur and oxygen-bearing gases.

* * * * *